(12) United States Patent
Nishikawa

(10) Patent No.: US 7,194,130 B2
(45) Date of Patent: Mar. 20, 2007

(54) IMAGE PROCESSING APPARATUS AND METHOD, AND RECORDING MEDIUM

(75) Inventor: Naoyuki Nishikawa, Kanagawa-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 55 days.

(21) Appl. No.: 10/967,242

(22) Filed: Oct. 19, 2004

(65) Prior Publication Data

US 2005/0053280 A1    Mar. 10, 2005

Related U.S. Application Data

(62) Division of application No. 09/428,454, filed on Oct. 28, 1999, now Pat. No. 6,836,565.

(30) Foreign Application Priority Data

Oct. 29, 1998  (JP) ............................... 10-308948
Oct. 29, 1998  (JP) ............................... 10-308949

(51) Int. Cl.
*G06K 9/00*    (2006.01)

(52) U.S. Cl. ..................................... 382/167; 382/274

(58) Field of Classification Search ................ 382/167, 382/274, 298, 299; 358/519
See application file for complete search history.

(56) References Cited

U.S. PATENT DOCUMENTS

| 5,740,267 A | 4/1998 | Echerer et al. ............. 382/132 |
| 5,802,361 A | 9/1998 | Wang et al. ................ 382/217 |
| 5,991,783 A * | 11/1999 | Popa et al. .................. 715/522 |

* cited by examiner

*Primary Examiner*—Phuoc Tran
(74) *Attorney, Agent, or Firm*—Fitzpatrick, Cella, Harper & Scinto

(57) ABSTRACT

Conventionally, when a correction parameter is determined on the basis of the feature of an image obtained by analyzing image data, and the image is corrected, the processing speed becomes considerably low. In this invention, for an image file stored in an apparatus, reduced image data held in the file is analyzed to determine a correction parameter in printing, and the image is corrected on the basis of the correction parameter, thereby shortening the processing time. When an appropriate correction parameter is determined for an image file stored in the apparatus and added to the file in advance before printing, and the image is corrected on the basis of the correction parameter in printing, the processing time is further shortened.

9 Claims, 18 Drawing Sheets

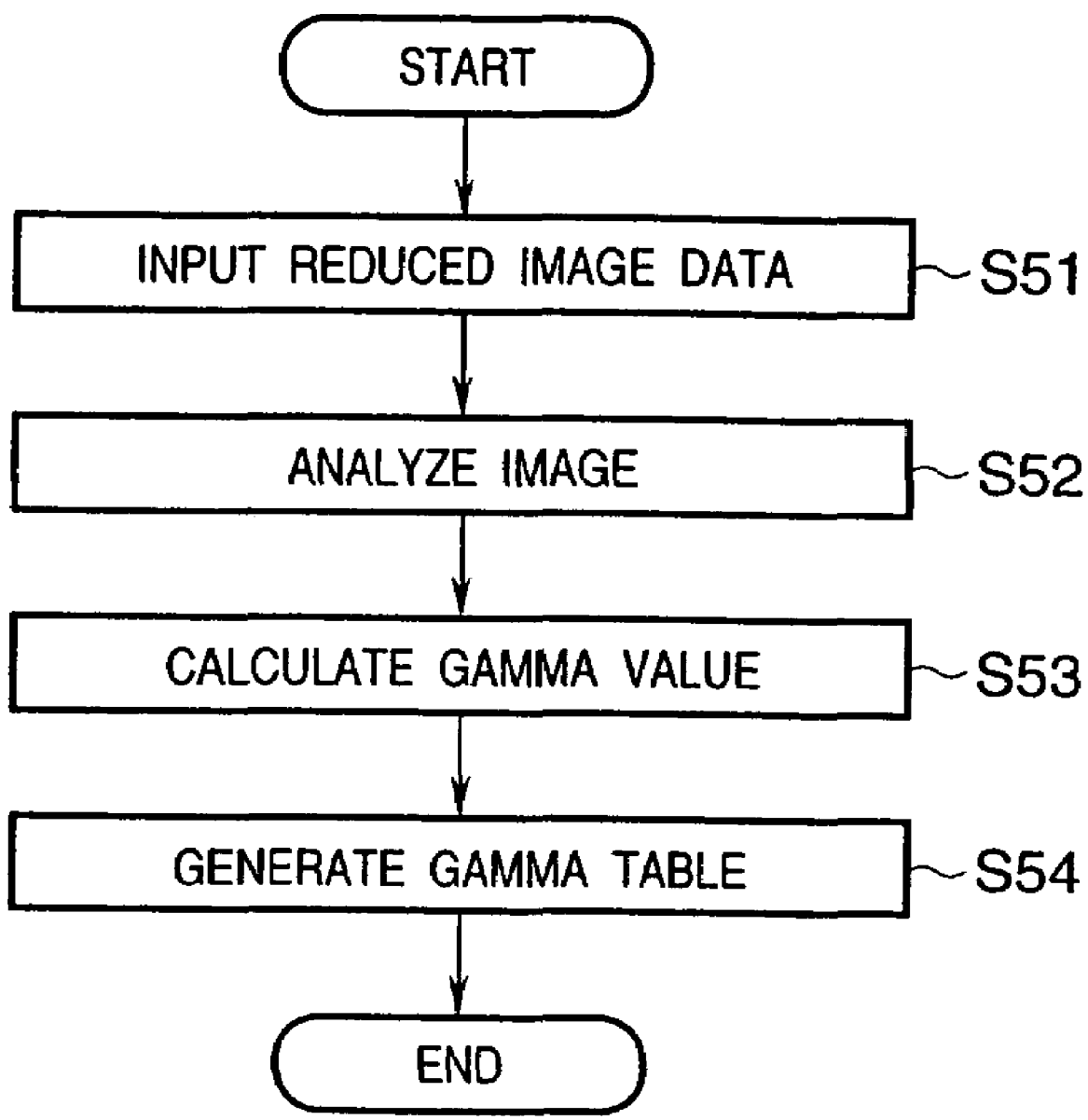

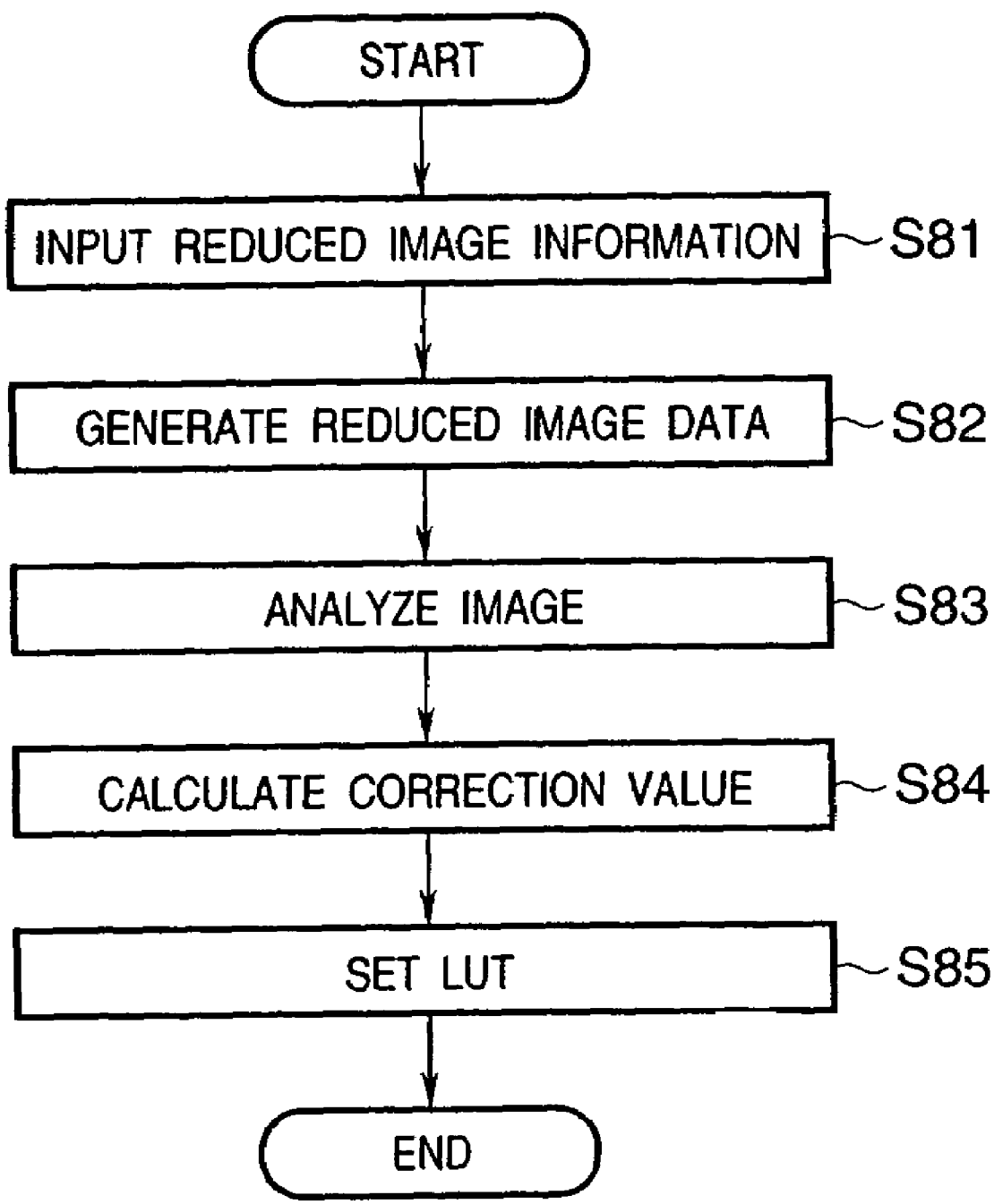

FIG. 9A

PRINTER COLOR ADJUSTMENT

○ AUTO COLOR MANAGER

⦿ MANUAL SETUP   [SET DETAILS]                    [DEFAULT]

FIG. 9B

PRINTER COLOR ADJUSTMENT - SET DETAILS

| USER DESIGNATION | GAMMA CORRECTION VALUE | COLOR LUT |
|---|---|---|
| ○ | 1.12 | TYPE-A (CORRECT IMAGE WITH LOW SATURATION) |

○ USE GAMMA CORRECTION TAG (HIGH SPEED)

○ ANALYZE PREVIEW IMAGE OF FILE

⦿ ANALYZE IN PRINTING (ACCURATE)   [SET]   [DEFAULT]

FIG. 9C

SET REFERENCE AVERAGE VALUE (TRD): 98

SET CORRECTION WIDTH:
- +DIRECTION, UP TO 1.4 (AH)
- −DIRECTION, UP TO 0.78 (AL)

CORRECTION INTENSITY: 50% (WGT)

[DEFAULT]   [OK]   [CANCEL]

FIG. 10A
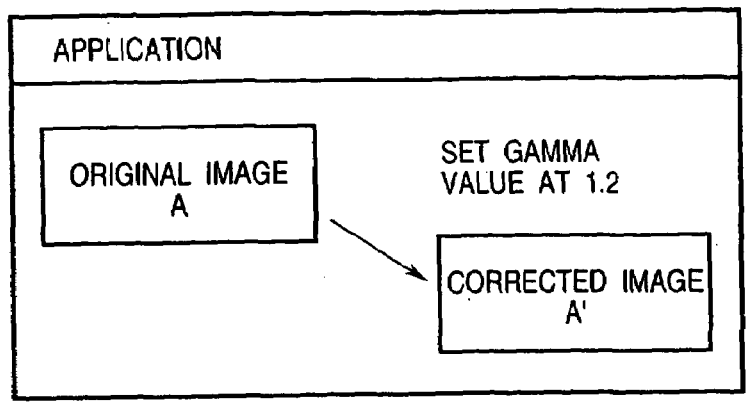
FIG. 10B
- STORE CHANGED IMAGE
- UPDATE ONLY INFORMATION TAG WITHOUT CHANGING ORIGINAL (DATA PORTION)
- UPDATE ONLY RESOURCE INFORMATION PORTION WITHOUT CHANGING ORIGINAL FILE
FIG. 10C
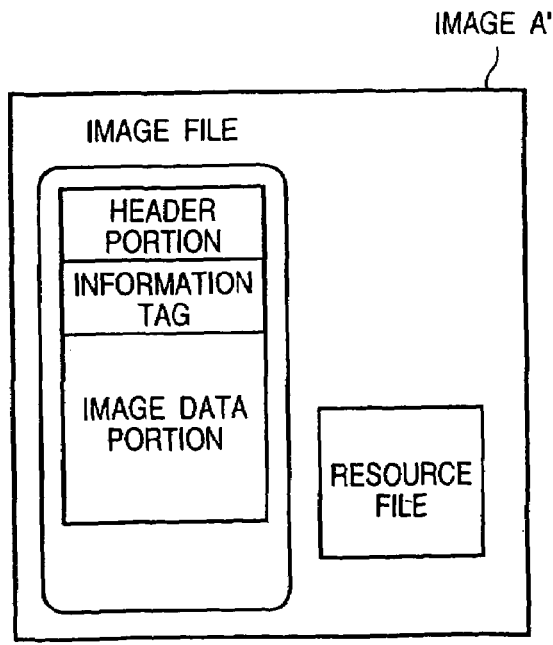

FIG. 14A

1. TYPE OF FILE
2. DATE CONDITION
3. OTHERS

CONDITION  1+2*3

BMP IMAGE
DIF IMAGE
GIF IMAGE
PICT FILE IMAGE
WVI IMAGE

ADD  DELETE  RETURN TO STANDARD

○ ALL DATES
○ FROM 97/11/? TO 98/1/*

REGULAR EXPRESSION
MATCH OF FILE NAME

[A-D]?imgN[0-9]*\.nsw

EXECUTION USER
USER : IMG DEMON
PASSWORD : ******

PROCESS MANAGEMENT
PRIORITY 5

☑ DESIGNATE EXECUTION TIME   ☐ CONDITIONAL EXECUTION
FROM 23:00 TO 4:30            SET TRIGGER
SET DETAILS

RETURN TO STANDARD

FIG. 18A

PRINTER COLOR ADJUSTMENT     W31

○ AUTO COLOR MANAGER

● MANUAL SETUP   [SET DETAILS]     [DEFAULT]

FIG. 18B

PRINTER COLOR ADJUSTMENT - MANUAL SETUP     W32

○ USE GAMMA CORRECTION TAG (AS IN AUTOMATIC SETTING)

○ NON-USE GAMMA CORRECTION TAG (NEGLECT)

● USE SETTING IN PRINTING   [SET]    [DEFAULT]

SET REFERENCE AVERAGE VALUE (TRD): 98

SET CORRECTION WIDTH
- +DIRECTION, UP TO 1.4 (AH)
- −DIRECTION, UP TO 0.78 (AL)

CORRECTION INTENSITY (WGT): 50%

[DEFAULT]    [OK]   [CANCEL]

IMAGE PROCESSING APPARATUS AND METHOD, AND RECORDING MEDIUM

This application is a divisional application of U.S. application Ser. No. 09/428,454, filed Oct. 28, 1999, now U.S. Pat. No. 6,836,565.

BACKGROUND OF THE INVENTION

This invention relates to an image processing apparatus and method and a recording medium and, more particularly, to an image processing apparatus and method which correct image data, and a recording medium.

Conventionally, an image read with a color device (digital camera or scanner) without using any color management system (CMS) tends to be an image poor in quality because the contrast is weak or saturation is low because of, e.g., inappropriate gamma adjustment. When such a poor-quality image is directly printed, only a printout with a considerably degraded image quality is obtained.

To solve this problem, before an input poor-quality image is printed, image data already stored in a storage device or the like is accessed and analyzed to obtain the feature of the image. When the image data is appropriately corrected in accordance with the feature of the image, the quality of the output image can be improved.

In the conventional correction method, however, correction parameters must be determined on the basis of the feature of the image obtained by image analysis, and the image must be corrected on the basis of the correction parameters. Hence, the speed of processing required for image output is largely reduced. Especially, when the resolution of image data becomes high to increase the data amount, the processing speed is extremely reduced.

To prevent the processing speed from decreasing due to an increase in data amount, data may be thinned. Although the processing speed can be increased with this method, the processing resolution becomes low, and appropriate correction processing cannot be performed, resulting in degradation in quality of the output image.

SUMMARY OF THE INVENTION

Accordingly, it is an object of the present invention to provide an image processing apparatus and method which allow high-speed image correction processing by determining a correction parameter on the basis of image information added to an image to be corrected, and a recording medium.

According to the present invention, the foregoing object is attained by providing an image processing apparatus comprising: input means for inputting reduced image information of image data; analysis means for analyzing the reduced image information; setting means for setting a correction parameter of the image data on the basis of an analysis result; and correction means for correcting the image data on the basis of the correction parameter.

With this arrangement, the reduced image information of image data can be analyzed by the analysis means, a correction parameter based on the analysis result can be set by the setting means, and the image data can be corrected by the correction means on the basis of the correction parameter.

And it is another object of the present invention to provide an image processing apparatus and method which allow the user to arbitrarily set various conditions associated with image correction and provide a more suitable print environment, and a recording medium.

According to the present invention, the foregoing object is attained by providing an image processing apparatus further comprising instruction means for instructing one of automatic setting and manual setup for image data correction processing.

With this arrangement, the user can arbitrarily set various conditions associated with image correction when said instruction means instructs manual setup.

And it is another object of the present invention to provide an image processing apparatus and method which determine a correction parameter for image data held in a device and adds the parameter to the image data file in advance to allow high-speed image correction processing at the time of output, and a recording medium.

According to the present invention, the foregoing object is attained by providing an image processing apparatus comprising: holding means for holding image data in a predetermined file format; analysis means for analyzing the image data; calculation means for calculating a correction parameter of the image data on the basis of an analysis result; and addition means for adding the correction parameter to a file of the image data.

With this arrangement, image data held by the holding means can be analyzed by the analysis means, a correction parameter based on the analysis result can be calculated by the calculation means, and the correction parameter can be added to the image data file by the addition means.

The invention is particularly advantageous since appropriate correction processing can be performed at a high speed by determining, at a high speed, the correction parameter on the basis of the reduced image information of an image to be corrected.

Since the user can arbitrarily set various conditions associated with image correction, a more suitable print environment can be provided.

When the correction parameter is determined for image data held in a device and added to the image data file in advance, the image can be corrected at a high speed at the time of output.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a flow chart showing gamma correction value calculation processing in the first embodiment;

FIG. 8 is a flow chart showing correction value calculation processing in the second embodiment;

FIGS. 9A to 9C are views showing examples of setup windows in the third embodiment of the present invention;

FIGS. 10A to 10C are views showing a method of setting image correction parameters for an image file in the third embodiment;

FIGS. 14A to 14E are views showing examples of setup windows in the fourth embodiment of the present invention;

FIGS. 18A to 18C are views showing examples of setup windows for setting details of image correction parameters in the sixth embodiment of the present invention.

DESCRIPTION OF THE PREFERRED EMBODIMENTS

Preferred embodiments of the present invention will now be described in detail in accordance with the accompanying drawings.

<First Embodiment>

Figure 1:
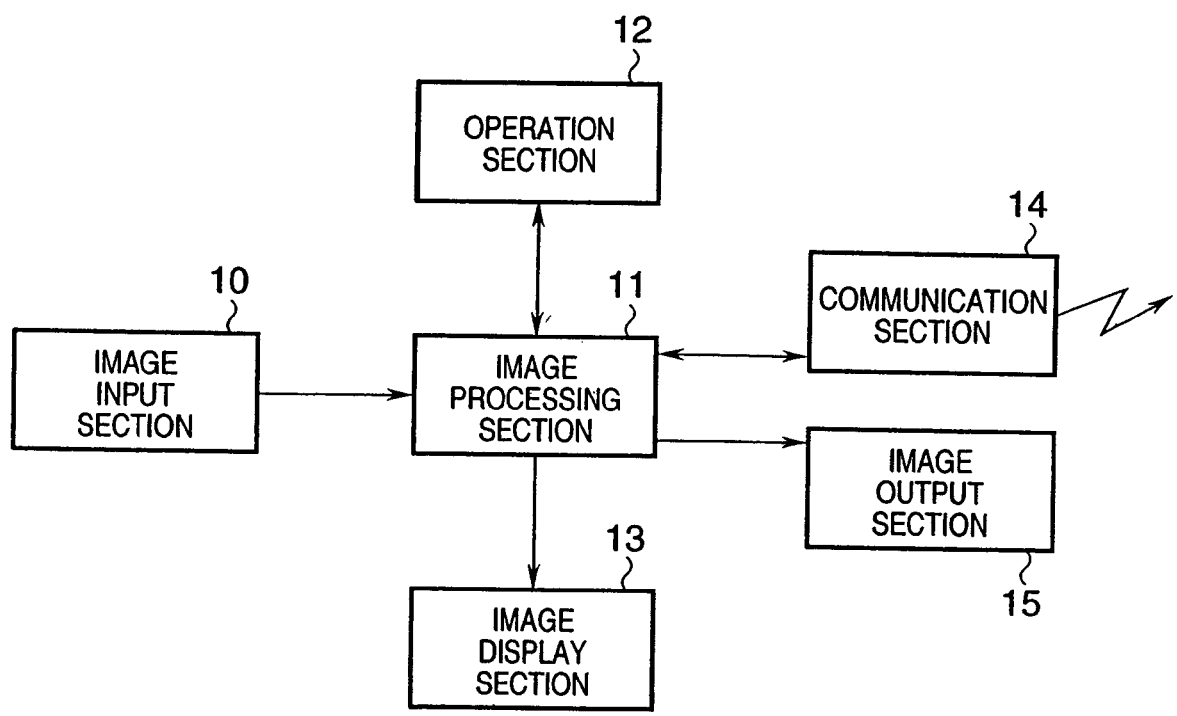
FIG. 1 is a block diagram showing the schematic arrangement of an image processing apparatus according to the first embodiment of the present invention.

FIG. 1 is a block diagram showing the arrangement of an image processing apparatus according to the first embodiment. Referring to FIG. 1, an image input section 10 is a color device (digital camera or scanner) without using any color management system (CMS). An image processing section 11 performs various image processing operations including image correction processing as the characteristic feature of this embodiment. An operation section 12 such as an operation panel allows a user to input a command or notifies the user of the state of the image processing apparatus. An image display section 13 such as a CRT displays image data. A communication section 14 transmits or receives image data. For example, the communication section 14 is connected to an external host computer to perform the same image input processing as in the image input section 10 or the same image output processing as in an image output section 15. The image output section 15 prints and outputs image data on a printing medium. In this embodiment, the image output section 15 is, e.g., a printer.

Figure 2:
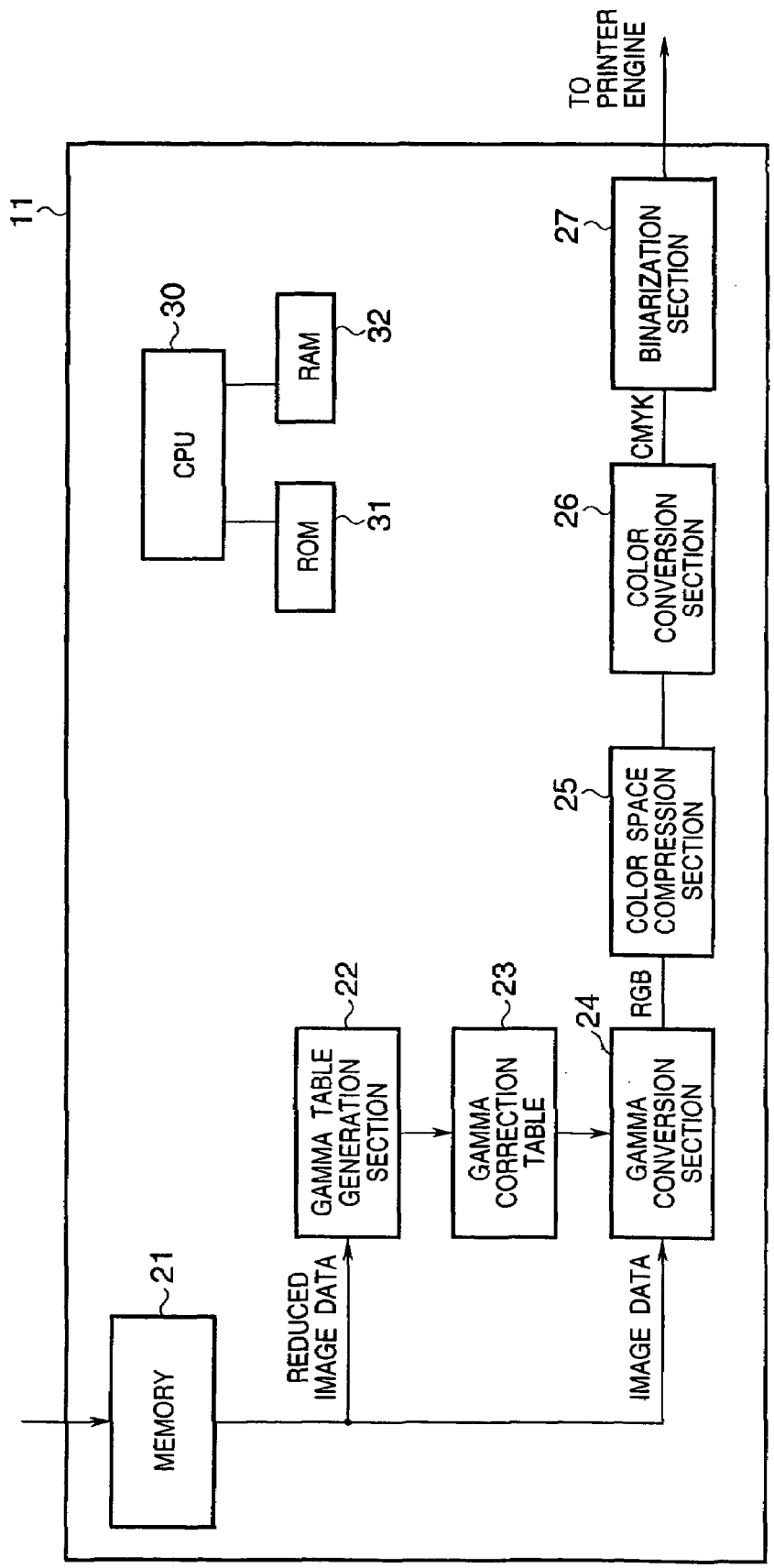
FIG. 2 is a block diagram showing the functional arrangement of an image processing section of the first embodiment.

FIG. 2 is a block diagram showing the functional arrangement of the image processing section 11. Referring to FIG. 2, a CPU 30 executes a control program held in a ROM 31 or a program loaded into a RAM 32, thereby systematically controlling operations in the remaining components (to be described later) in the image processing section 11. The RAM 32 is used as the work area of the CPU 30.

Image data input from the image input section 10 is stored in a memory section 21 first.

The image data storage format in the memory section 21 will be described with reference to FIG. 3.

Figure 3:
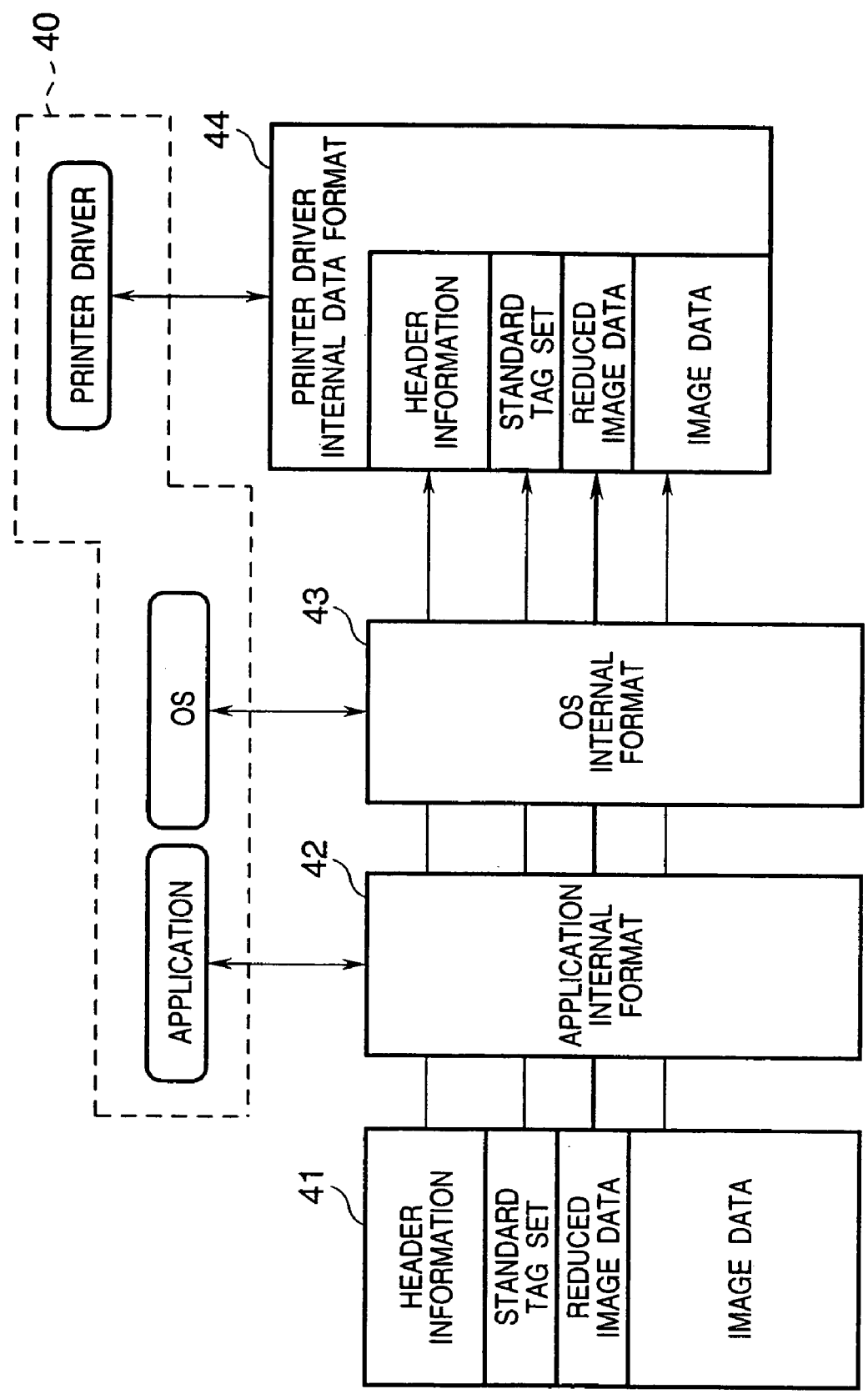
FIG. 3 is a view showing the image data file storage formats in the first embodiment.

The image data from the image input section 10 is input to the memory section 21 as a file 41 shown in FIG. 3. As the characteristic feature of this embodiment, the input image data contains reduced image data. Reduced image data means image data obtained by reducing the resolution of original image data to decrease the number of pixels. A so-called thumbnail image and a preview image that displays the outline of original image data before it is displayed on the image display section 13 are also included in the reduced image data. The reduced image data may be a partial image obtained by extracting the feature portion of the original image as far as the number of pixels is decreased.

Figure 4A:
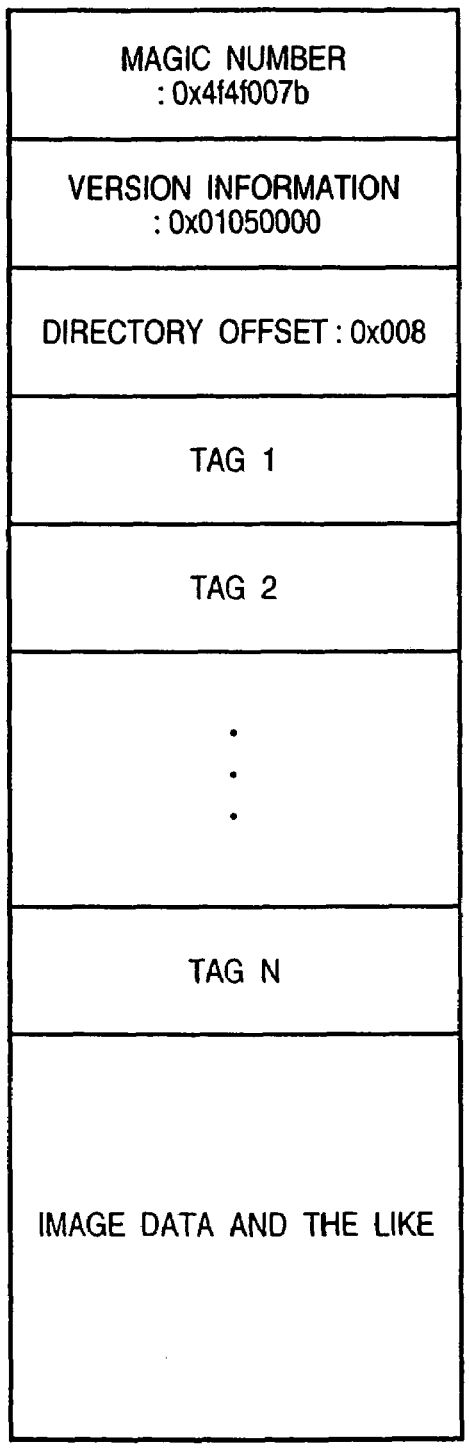
FIGS. 4A and 4B are views showing the image data file formats in the first embodiment.
Figure 4B:
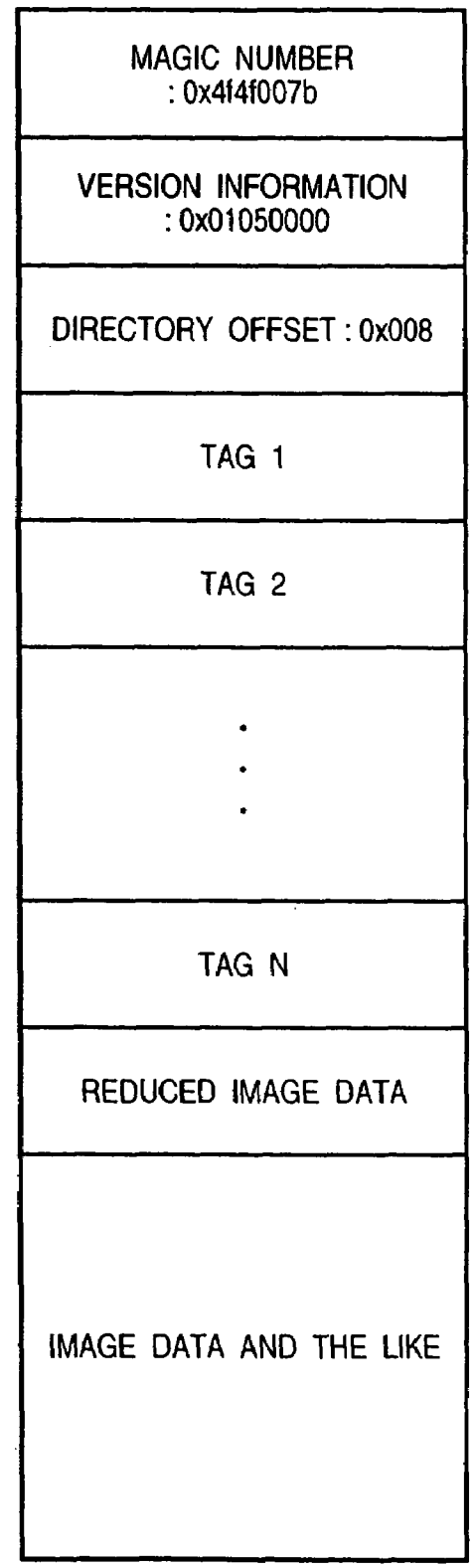

FIG. 4B shows the detailed file format of the file 41. Referring to FIG. 4B, "magic number", "version information", and "directory offset" correspond to the header information of the file 41 shown in FIG. 3, and "tag 1" to "tag N" correspond to the standard tag set. "Reduced image data" and "image data" follow them.

The "reduced image data" shown in FIG. 4B may be either the above-described reduced image data itself or the address information (pointer) of the memory space where the reduced image data is stored.

Referring to FIG. 3, reference numeral 40 denotes a general idea of various programs executed by the CPU 30. The image data file 41 input from the image input section 10 is converted into a file 42 having an application internal format by the application program (to be referred to as an application hereinafter) executed by the CPU 30. Generally, an application for processing image data executes processing by appropriately referring to necessary data in an image data file and converting the data into the application internal format.

To print the image by a printer, the API or the like of the operating system (to be referred to as an OS hereinafter) is used to change the image data file 42 having the application internal format in accordance with the OS internal format. After this, the image is transferred to a printer drive for controlling the printer. That is, the image data file 42 having the application internal format is converted into a file 43 with an OS internal format and then converted into a file 44 having a printer driver internal format.

In this embodiment, the reduced image data of the input image file 41 must be supplied to the printer driver. The reduced image data must be supplied to the printer driver even when the image file 41 does not contain the reduced image data, i.e., the reduced image data is present as an independent file. To cope with this, the application may ensure an area for reduced image data in addition to the members of the data structure of the file 41 and transfer the reduced image data to the area.

When the input image file 41 is to be converted into the file 42 having the application internal format, reduced image data as an independent file is read in a recording area ensured by the application. In starting printing the image data, the pointer of the storage area of the reduced image is contained in the information to be transferred to the OS.

In this embodiment, even when the input file 41 has a format shown in FIG. 4A, the file 41 is converted into the file 42 having a format including the reduced image data by the application, as shown in FIG. 4B. The printer driver side can access the reduced image data on the basis of the transferred pointer. The application itself may have a function of generating reduced image data.

Referring back to FIG. 2, processing by the printer driver will be mainly described below. As described above, the printer driver analyzes reduced image data added to an image file to determine the gamma correction value for printing and performs gamma conversion using the correction value. Hence, unlike a case wherein the entire image data is analyzed to calculate the gamma correction value, an appropriate gamma correction value can be obtained in a short time.

A gamma table generation section 22 calculates the correction value for gamma conversion on the basis of the reduced image data to generate a gamma correction table 23. A method of calculating the gamma correction value by the gamma table generation section 22 will be described below with reference to the flowchart in FIG. 5. In this example, the gamma correction value is uniquely obtained using a function containing a natural logarithm and the like on the basis of the average lightness value of the entire screen.

In step S51, the reduced image data of image data to be gamma-corrected is input.

In step S52, the reduced image data is analyzed. More specifically, lightness data L is obtained in accordance with equation (1):

$$L=0.29 \times R+0.59 \times G+0.12 \times B \qquad (1)$$

An average value Lavg of all pixels of the lightness data L is obtained to calculate normalized data Lv. When the image has 24-bit RGB data, the average value Lavg can take one of values of 1 to 255.

$$Lv=Lavg/255 \qquad (2)$$

An ideal Lv has a value of about 0.5.

When the value Lv is close to 0, the image becomes dark. Conversely, when the value Lv is close to 1, the image tends to be bright. For example, when the value Lv is 0, the RGB data values of all pixels are 0, i.e., the image is black. This image (Lv=0) is not appropriate for arithmetic processing to be described later and therefore is excluded from the correction targets in this embodiment.

In step S53, the following calculation is done on the basis of the obtained value Lv to obtain a correction gamma value Gv.

$$Gv=\ln(0.5)/\ln(Lv) \qquad (3)$$

(ln( ) is the natural logarithmic function, and Lv≠0)

To limit the correction value, the upper and lower limit values of the gamma correction value may be defined.

In step S54, the gamma correction table 23 is generated on the basis of the correction gamma value Gv such that $y=x^{Gv}$ can be calculated for each of the RGB values. Alternatively, the closest correction value is appropriately selected from a plurality of gamma values (e.g., γ=1.4, 1.8, 2.2, . . . ) that are prepared in advance.

A gamma conversion section 24 shown in FIG. 2 gamma-corrects the RGB values of the input image data using the gamma correction table 23 generated on the basis of the reduced image data as described above. The image data is transferred to a color space compression section 25 on the output side.

The color space compression section 25 compresses the color space of the input RGB data which are gamma-corrected, on the basis of an ICC color profile. A color space conversion section 26 converts the RGB data into YMCK data. The data is binarized by a binarization section 27 and then output to the image output section 15 corresponding to the printer engine.

As described above, according to the first embodiment, the gamma correction value is appropriately determined on the basis of the reduced image information of the input image, thereby appropriately correcting the image in a short time.

<Second Embodiment>

The second embodiment of the present invention will be described below. An image processing apparatus according to the second embodiment has the same arrangement as that shown in FIG. 1 described in the first embodiment, and a detailed description thereof will be omitted.

As the characteristic feature of the second embodiment, reduced image information added to an image file is read by the printer driver via an application and OS, reduced image data is generated on the basis of the reduced image information and analyzed on the printer driver side, thereby setting image correction parameters.

Figure 6:
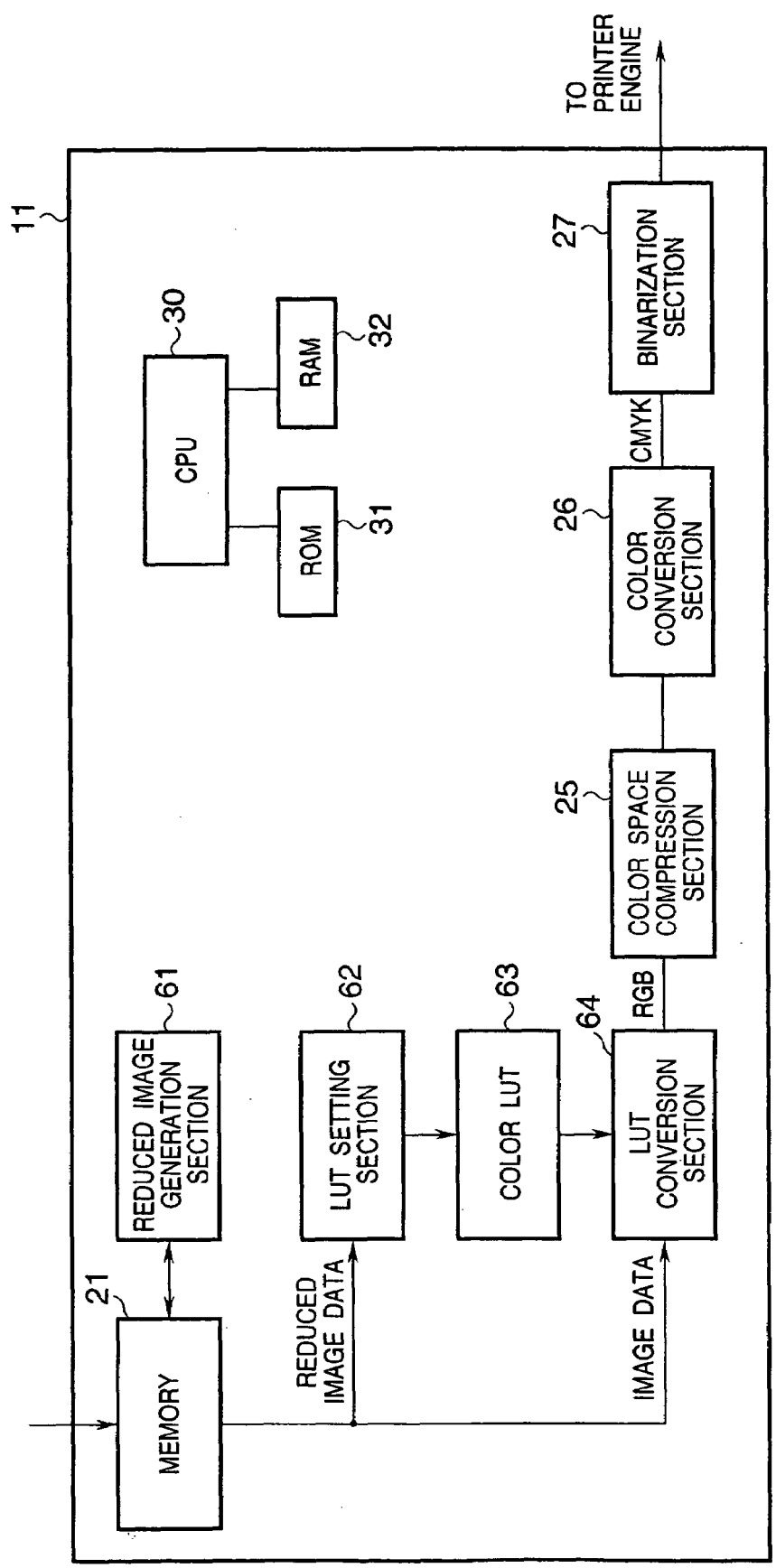
FIG. 6 is a block diagram showing the functional arrangement of an image processing section according to the second embodiment of the present invention.

FIG. 6 is a block diagram showing the functional arrangement in an image processing section 11 according to the second embodiment. The same reference numerals as in FIG. 2 described in the first embodiment denote the same parts in FIG. 6, and a detailed description thereof will be omitted.

Image data input from an image input section 10 is stored in a memory section 21. The image data storage formats in the memory section 21 in the second embodiment will be described with reference to FIG. 7.

Figure 7:
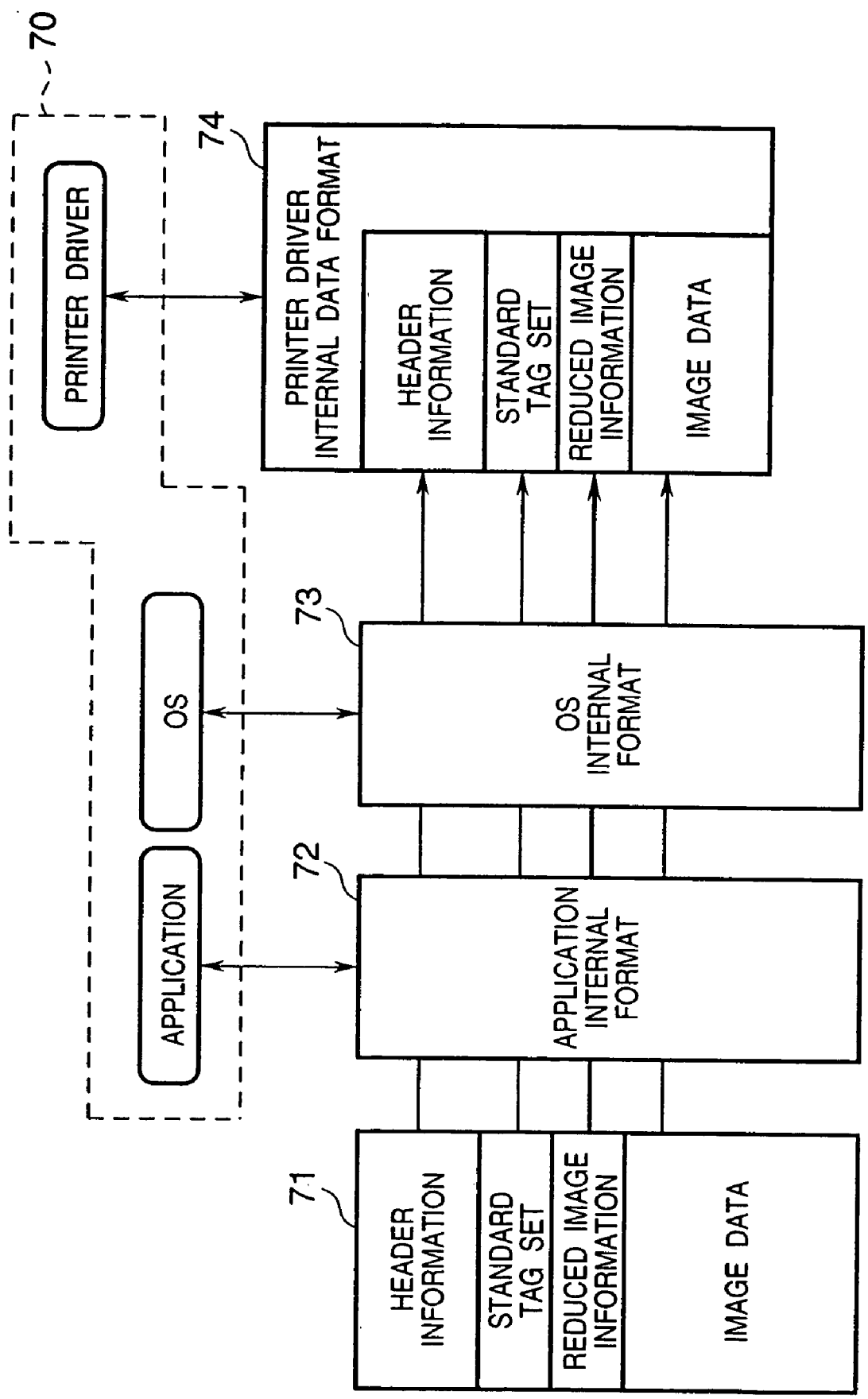
FIG. 7 is a view showing the image data file storage formats in the second embodiment.

Image data from the image input section 10 is input to the memory section 21 as a file 71 shown in FIG. 7. As the characteristic feature of this embodiment, the input image data contains reduced image information.

The reduced image information means not reduced image data itself but information used to generate a reduced image. Assume that the original image is constructed by plane-sequential RGB pixels each having 1 byte data, and a reduced image (preview image) is generated by thinning the addresses of pixels every 8 bytes. In this case, the difference between a pixel obtained by accessing the addresses every 8 bytes and the average value of pixels (e.g., 8×8 pixels) around the pixel is obtained in advance and stored in the file 71 as reduced image information. In use of this reduced image information, when the original image is a graphic image generated by a computer or the like, the ratio of pixels whose difference from peripheral pixels is 0 is considerably high, and the compression ratio in compressing the reduced image information can be improved.

The reduced image information in the second embodiment can have not only the above-described plain-sequential structure but also a structure formed in units of rectangular areas.

In the second embodiment, although the reduced image data itself is not independently present in the file 71, reduced image information for generating reduced image data at a high speed from the original image data or part of data based on the original data is added in advance to the image file 71 in the form of, e.g., a tag.

Referring to FIG. 7, reference numeral 70 denotes a general idea of various programs executed by a CPU 30. The image data file 71 input from the image input section 10 is converted into a file 72 with an application internal format by the CPU 30, then into a file 73 with an OS internal format, and finally into a file 74 with a printer driver internal format.

In the second embodiment as well, the reduced image information contained in the input image file 71 must be transferred to the printer driver, as in the first embodiment. Even when the image file 71 contains no reduced image information, reduced image information must be supplied to the printer driver. To cope with this, the application may add extension information representing reduced image information to the members of the data structure of the file 71.

Referring back to FIG. 6, processing by the printer driver in the second embodiment will be described below. In the second embodiment, the printer driver generates reduced image data on the basis of the reduced image information added to the image file, as described above, and analyzes the reduced image to determine the gamma correction value for printing.

First, a reduced image generation section 61 generates, on the memory 21, reduced image data on the basis of the input reduced image information. A look-up table (to be referred to as an LUT hereinafter) setting section 62 sets a color LUT 63 for color correction on the basis of the reduced image data. A method of setting the color LUT in the second embodiment will be described below with reference to the flow chart shown in FIG. 8.

In step S81, the reduced image information of image data to be corrected is input. In step S82, the reduced image generation section 61 generates reduced image data on the basis of the reduced image information. In step S83, the LUT setting section 62 analyzes the reduced image data. More specifically, a pixel average value is calculated to obtain a gamma correction value, as in the above-described first embodiment, or a white point is calculated to correct the light source.

In step S84, a correction value (gamma correction value or light source correction value) is obtained on the basis of the analysis result. In step S85, the color LUT 63 is generated on the basis of the obtained correction value. An appropriate color LUT may be selected from a plurality of LUTs prepared in advance.

An LUT conversion section 64 shown in FIG. 6 appropriately converts the RGB values of the input image data using the color LUT 63 selected or generated on the basis of the reduced image data, as described above. The image data is sent to a color space compression section 25 on the output side. The subsequent processing is the same as in the first embodiment, and a detailed description thereof will be omitted.

As described above, according to the second embodiment, the reduced image is generated on the basis of the reduced image information of the input image, and various correction values are determined on the basis of the reduced image data. Hence, even when the input image does not have the reduced image data itself, the image can be appropriately corrected in a short time.

<Third Embodiment>

The third embodiment of the present invention will be described below. In the third embodiment, in addition to image correction processing in the above-described first and second embodiments, flexible print environment setting by the user is allowed.

The general idea of operation in the third embodiment will be described first. FIGS. 9A to 9C and 10A to 10C are views showing examples of display windows for printer color adjustment on an operation section 12.

FIG. 9A shows a window W11 as a printer color adjustment window. In the window W11, when "Auto Color Manager" is selected for normal printing by the printer, appropriate correction processing is performed in accordance with image data to be printed.

If a gamma correction tag can be used in image data to be printed, correction using the gamma correction tag is automatically done. If no gamma correction tag can be used, the reduced image of the image is searched for. If the reduced image is present, the gamma correction value is determined by analyzing the reduced image. If no reduced image is present, the gamma correction value is determined by analyzing the entire image data. In this way, in the "Auto Color Manager" mode, optimum processing is automatically selected for printing.

The above-described gamma correction tag is one of expansion information tags added to an image file by an application or the like such that the image file is adapted to the printing method of the printer. When an image file is transferred to the printer driver, the gamma correction value already belongs to the image file.

A method of setting image correction parameters for an image file will be described with reference to FIGS. 10A to 10C. In the method to be described below, after an original image file A is opened, an appropriate gamma value (e.g., 1.2) for the image is set, and the file is stored as an image file A', as shown in FIG. 10A.

In the third embodiment, one of three choices as options can be selected to store an image file to be corrected. FIG. 10B shows an operation window having radio buttons for this selection. As the first method, image data is gamma-corrected to rewrite the image data itself, and the rewritten image data is stored. That is, the original image disappears basically. As the second method, only a tag of gamma correction information is added (or updated) to the image file without changing the original image data. In this case, the date of file update is rewritten. As the third method, the original file is not changed, and only the information portion in a resource file that holds detailed information associated with the original file is updated. In the third embodiment, the gamma correction value for the image file is set by selecting one of these three methods.

FIG. 10C shows the structure of the image file A' stored after correction. The corrected gamma correction value tag of the image file A' corresponds to information tag in the second method or the gamma information portion in the resource file in the third method.

In the third embodiment, by the above-described method, image correction parameters can be added to the inside of the image file to be corrected.

A case wherein "manual setup" is selected in the window W11 shown in FIG. 9A will be described below. When "manual setup" is selected, the "set details" button that is grayed in the "Auto Color Manager" mode becomes selectable. When the "set details" button is clicked, a window W12 shown in FIG. 9B is displayed.

When "user designation" is selected in the window W12, the user can arbitrarily designate the "gamma correction value" or arbitrarily select the "color LUT" for color correction from the selection menu by the user's decision.

When a selection item other than "user designation" is selected in the window W12, i.e., automatic processing is set, gamma processing or the like for image correction is set in accordance with the printing situation on the printer driver side.

For example, when "analyze preview image of file" is selected, and a preview image (reduced image) corresponding to the file to be printed is present, the preview image is analyzed to determine the gamma correction value. Even when an image correction tag is present in the image file, the tag is neglected. If no preview image is present for the file, the same processing as in selection of "analyze in printing" is forcibly executed.

Similarly, when "use gamma correction tag" is selected, and the image file has no gamma correction tag, the same processing as in selection of "analyze in printing" is forcibly executed.

In any case, to analyze the image in printing, the current set values are used as various set values for analysis. If setting for analysis has not been done at all, default values are used.

When "analyze in printing" is selected in the window W12, the image is analyzed in printing while neglecting the gamma correction tag added to the image file. In this case, conditions can be set in more detail. For example, when "analyze in printing" is selected, and the "set" button is clicked, a window W13 shown in FIG. 9C is displayed. In the window W13, the user can arbitrarily set various parameters including a reference average density value (TRD), positive direction of correction width (AH), negative direction of correction width (AL), and correction intensity (WGT).

By setting the various parameters, the gamma correction value can be calculated by the following method.

Let Lv (Lv≠0) be the average lightness of the printing image, TRD (about 128±40) be the reference average density value, and VMAX (VMAX≠0) be the maximum density value. When the image has 24-bit RGB data, a reference lightness Lt is given by $$Lt = TRD/VMAX \quad (4)$$

In the example shown in the window W13, Lt=98/255=0.3828.

An upper limit AH of the correction gamma value is defined by the function CfM( ), and a lower limit AL is defined by the function CfS( ). A reference correction gamma value Gvx is given by $$Gvx = CfS(CfM(\ln(Lt)/\ln(Lv))) \quad (5)$$

(where ln( ) is a natural logarithmic function) A correction gamma value Gv is represented as follows using the correction intensity WGT.

$$Gv = 1.0 - WGT + Gvx \times WGT \quad (6)$$

In the window W13, the calculated correction gamma value Gv is displayed as a graph for visual recognition.

In this way, the correction gamma value Gv is calculated using the correction intensity WGT. For this reason, even in a document including a plurality of images, the data can be corrected in only a small amount, i.e., damage to the original average density of each image can be minimized.

Assume that a document having a plurality of images A and B is printed by setting the reference average density value TRD at 98, and the average densities of the images A and B are 90 and 110, respectively. When the above-described calculation is executed, the gamma correction value applied to the image A is 0.959 at a correction intensity of 50% or 0.918 at a correction intensity of 100% The gamma correction value applied to the image B is 1.068 at a correction intensity of 50% or 1.136 at a correction intensity of 100%. As described above, when the gamma correction value is close to 1.0, the original image is weakly corrected without damaging the average density of the image. In the third embodiment, since the correction intensity WGT can be arbitrarily set, the user can arbitrarily set the gamma correction intensity, i.e., the degree of storage of the average density of the original image.

As described above, the gamma correction value Gv obtained when "analyze in printing" is selected in the window W12 is valid with priority over tag information added to the original image file. Hence, even when the gamma correction value has already been set at 1.2 for the image file A, this setting is neglected, and a new gamma correction value calculated on the basis of current setting is used.

As described above, according to the third embodiment, the user can set the image analysis timing and correction parameters, and high-speed printing with an arbitrary image quality is possible.

<Fourth Embodiment>

The fourth embodiment of the present invention will be described below. An image processing apparatus according to the fourth embodiment has the similar arrangement as that shown in FIG. 1 described in the first embodiment, and a detailed description thereof will be omitted.

Figure 11:
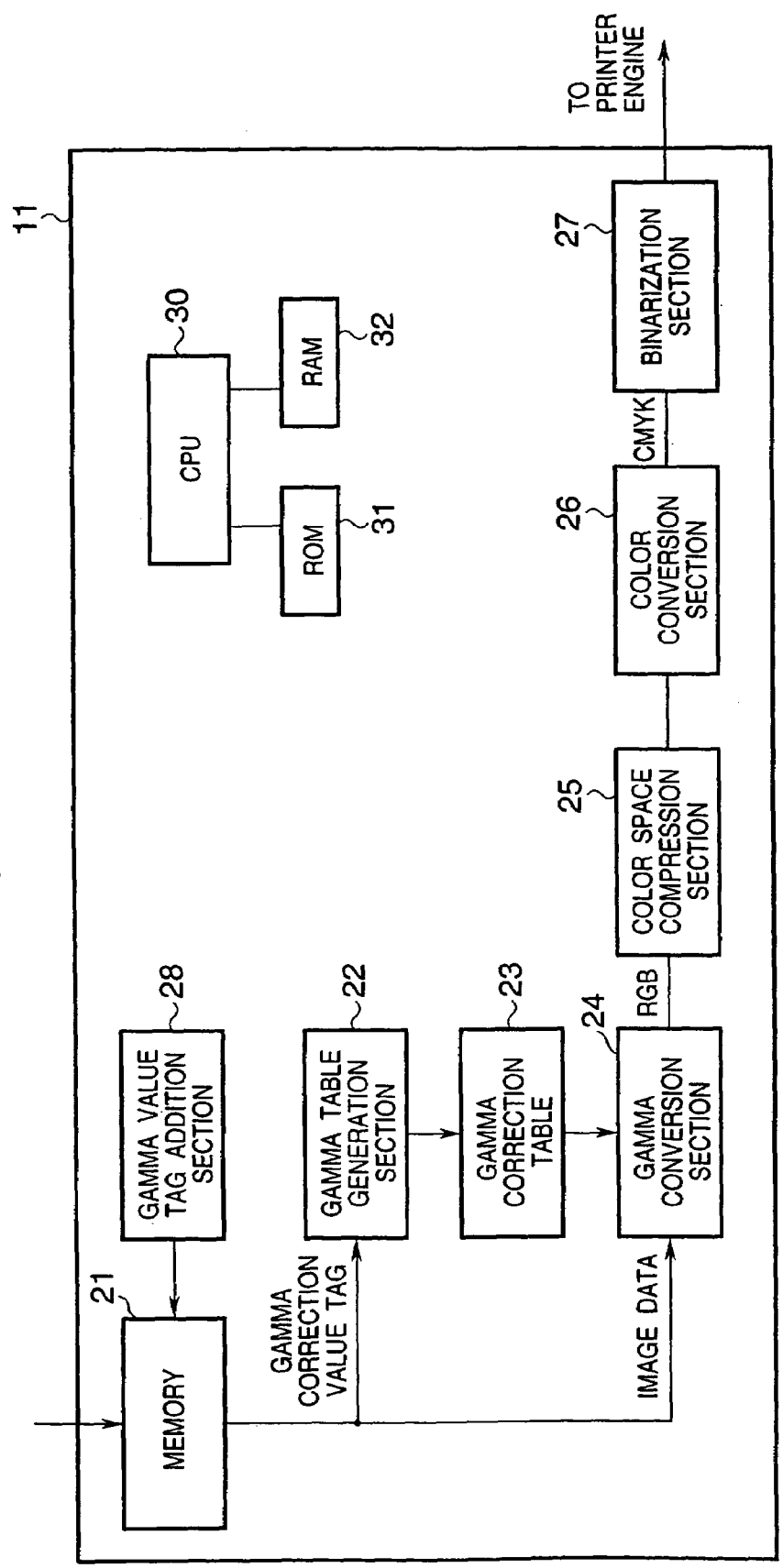
FIG. 11 is a block diagram showing the functional arrangement of an image processing section according to the fourth embodiment of the present invention.

FIG. 11 is a block diagram showing the functional arrangement in an image processing section 11 according to the fourth embodiment. The same reference numerals as in FIG. 2 described in the first embodiment denote the same parts in FIG. 11, and a detailed description thereof will be omitted.

Image data input from an image input section 10 is stored in a memory section 21 and added with a gamma value tag by a gamma value tag addition section 28. This gamma value tag addition processing will be described below.

Figure 12:
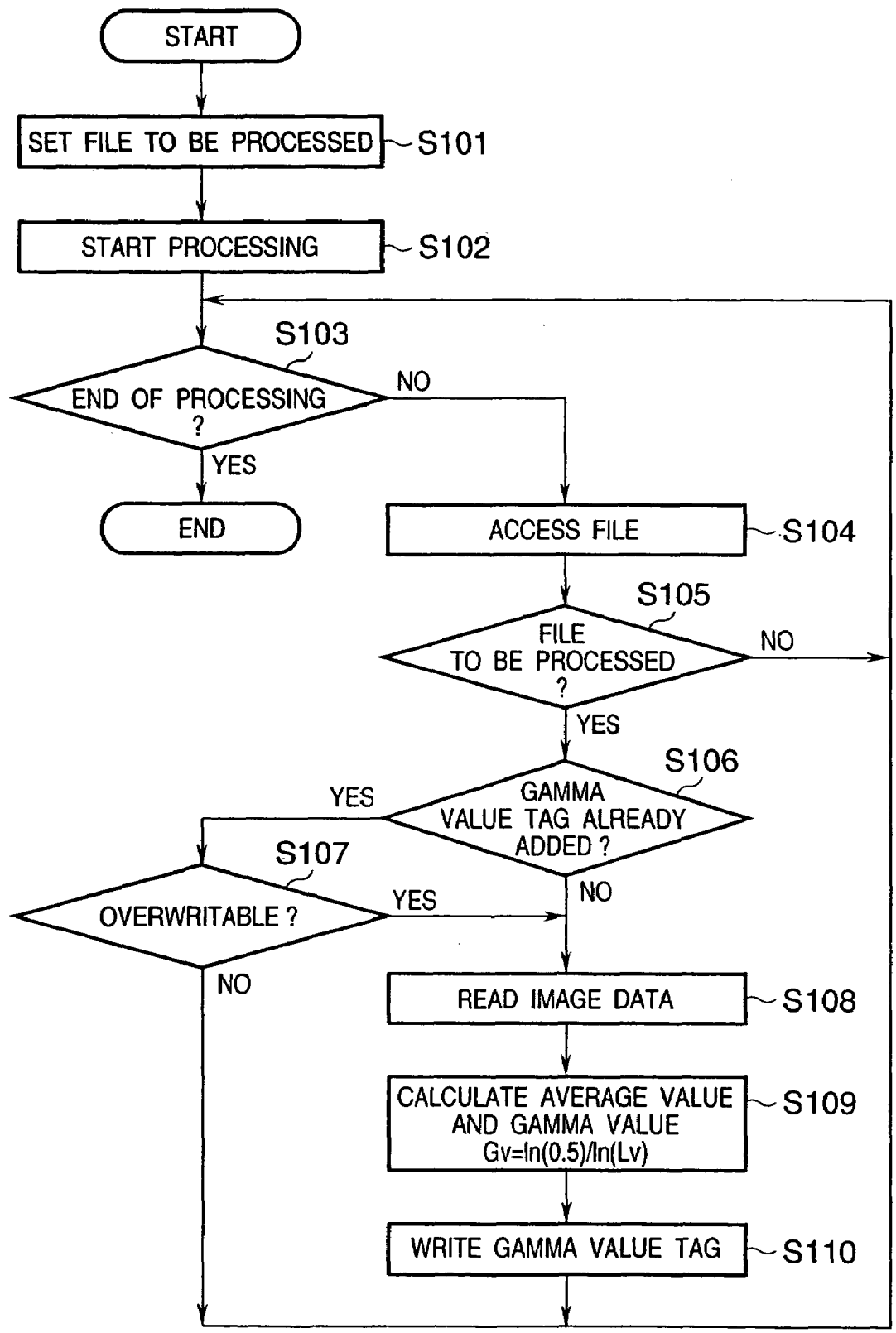
FIG. 12 is a flow chart showing gamma value tag addition processing in the fourth embodiment.

FIG. 12 is a flow chart of gamma value tag addition processing in the fourth embodiment. First, in step S101, the user sets, from an operation section 12, a file to which the gamma value tag is to be added. In step S102, if the execution conditions are satisfied, gamma value tag addition processing is executed.

A method of setting the file to be processed and execution conditions will be described with reference to FIGS. 13 and 14A to 14E.

Figure 13:
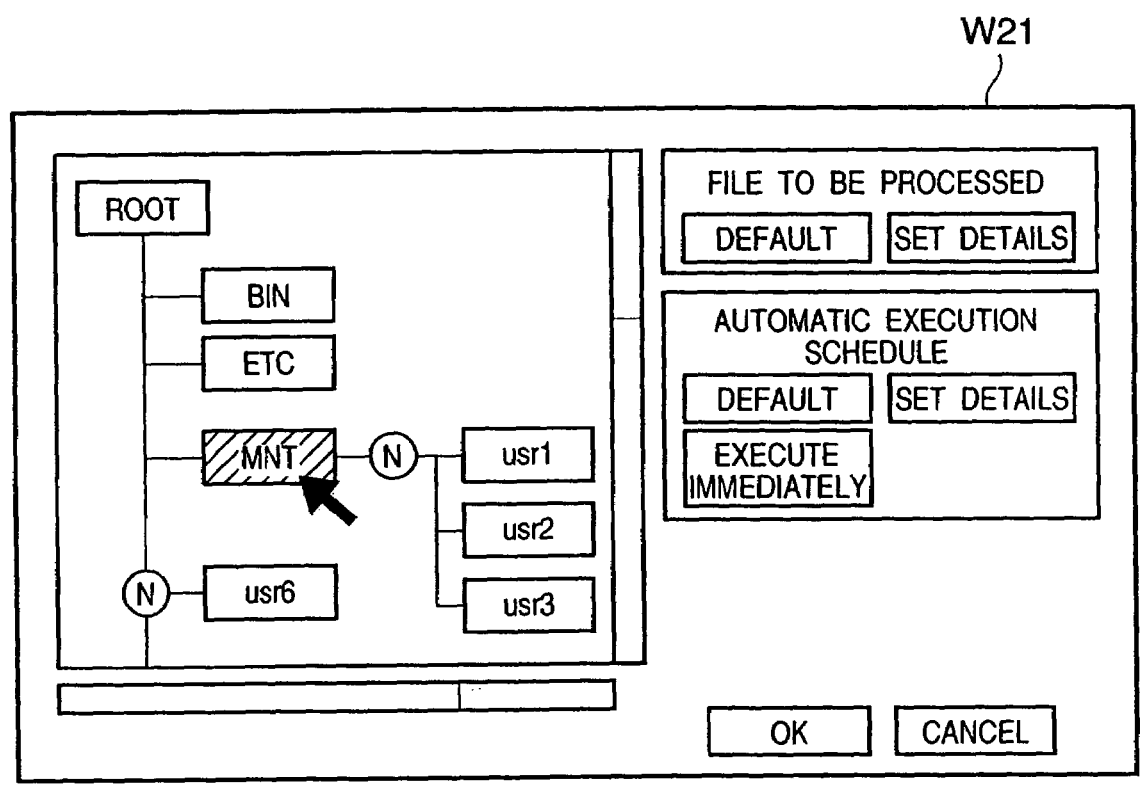
FIG. 13 is a view showing an example of a setup window in the fourth embodiment.

FIG. 13 is a view showing an example of a display window in setting the file to be processed and execution conditions. In a window W21 shown in FIG. 13, the tree structure of files is displayed to allow the user to search for and set the file to be processed. More specifically, in the window W21, since the overall structure of the file system is expressed as a tree structure, the user can easily select a desired file path using a mouse cursor or the like. For the designated file path, for example, the background color is inverted to show that the file path is selected.

After the "file to be processed" and "automatic execution schedule" are set, the user clicks the "OK" button to instruct job scheduling. In any item, processing is executed by designating "default" without any cumbersome setting processing. This default setting can also be changed by "set details".

A plurality of files can be designated as files to be processed by designating the file path or the like. To set the files to be processed, the type of files, date of processing, and the like can be combined as conditions items. More specifically, in the "file to be processed" shown in FIG. 13, the "set details" button is clicked to display a window W22 shown in FIG. 14A. When the "type of file", "date condition", and "others" in the window W22 are clicked, windows W23, W24, and S25 shown in FIGS. 14B to 14D are displayed, respectively. The files to be processed can be flexibly searched for and set on the basis of conditions of user's choice.

When the "set details" button in "automatic execution schedule" in FIG. 13 is clicked, a window W26 shown in FIG. 14E is displayed. In this window, "execution user (who has file access authority)", "priority" as a back process, or "execution time designation" can be arbitrarily set. For example, by "execution time designation", other jobs are less executed in the image processing apparatus or a system including this apparatus. Efficient operation can be expected by designating automatic execution, e.g., at night. Automatic execution may be started, stopped, or resumed in accordance with the load situation of the entire system while monitoring the load situation of a CPU 30 or the like.

Referring back to FIG. 12, when processing starts in step S102, it is determined in step S103 whether gamma value tag addition processing is to be ended, by comparing the path map to be searched with the current path.

If NO in step S103, the flow advances to step S104 to access a file on the current path. In step S105, it is determined whether the file is the file to be searched, which is set in step S101. If YES in step S105, a gamma value tag is searched for by looking up the header information, tag data, and the like in the file instep S106. When a gamma value tag is detected, i.e., the file already has a gamma value tag, the flow advances to step S107 to determine whether the tag can be overwritten. If YES in step S107, the flow advances to step S108. If NO in step S107, the flow returns to step S103.

When no gamma value tag is detected in step S106, i.e., no gamma value tag has been added to the file yet, the flow advances to step S108.

In step S108, image data (RGB values) is read out from the searched file. In step S109, a gamma value Gv is calculated on the basis of the image data. For example, as in steps S51 to S53 shown in FIG. 5 of the above-described first embodiment, data Lv is obtained by normalizing the average lightness value of all pixels in accordance with equations (1) and (2), and the correction gamma value Gv is calculated on the basis of the data Lv in accordance with equation (3).

In step S110, the correction gamma value Gv is written in the image file as a gamma value tag.

Figure 15A:
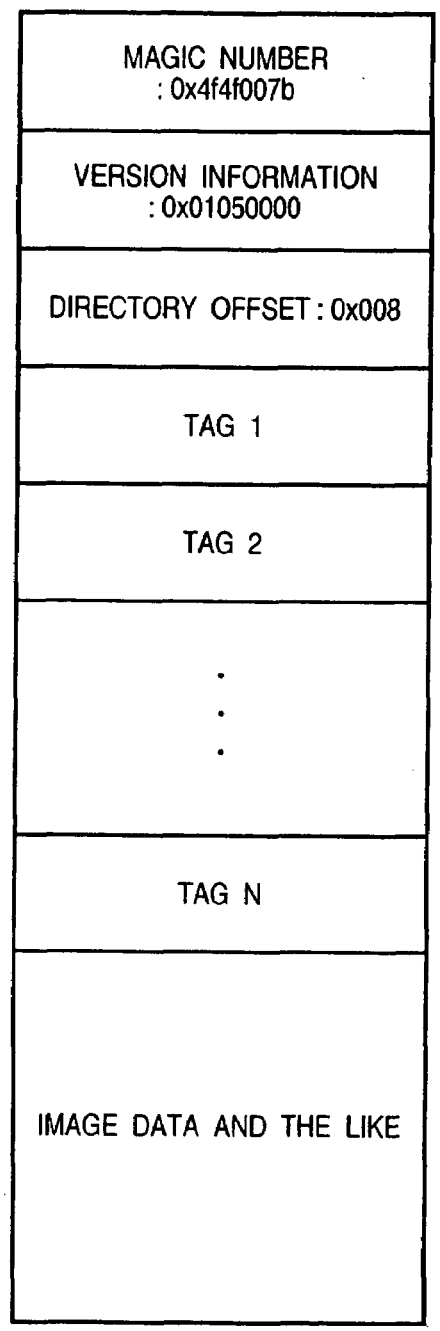
FIGS. 15A and 15B are views showing details of image data file formats in the fourth embodiment.
Figure 15B:
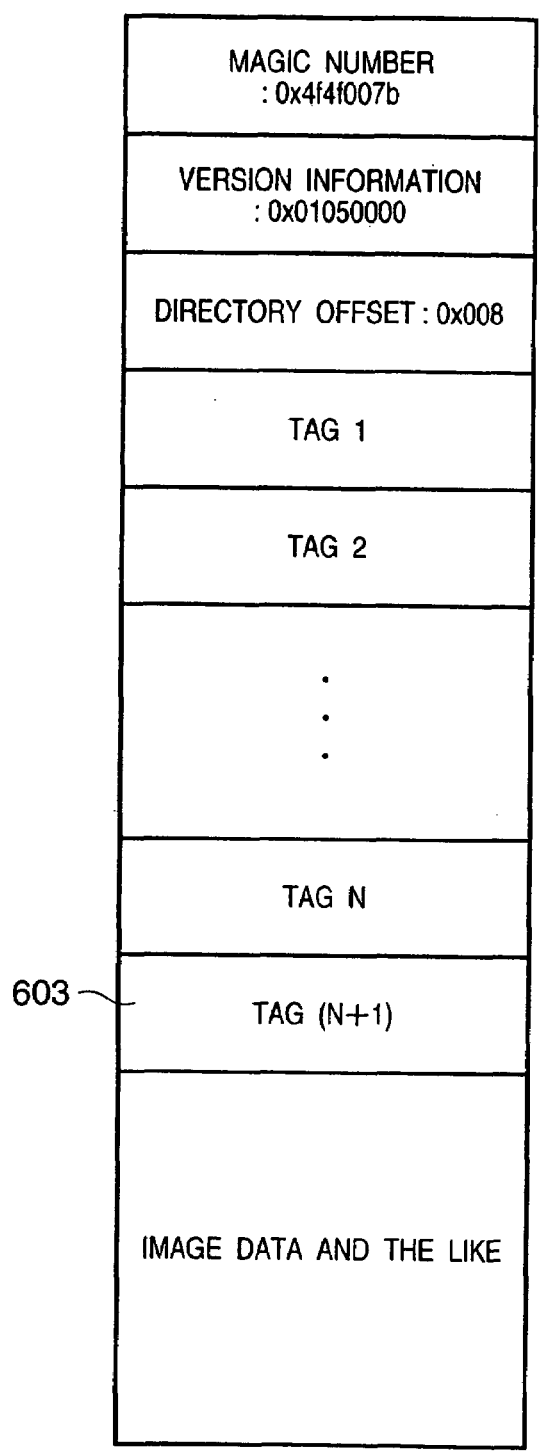

Processing of adding the gamma value tag in this embodiment will be described with reference to FIGS. 15A and 15B. FIG. 15B shows the structure of image data obtained by adding (N+1) th tag data 603 to image data shown in FIG. 15A. The correction gamma value Gv obtained in step S109 of FIG. 12 is written in the (N+1)th tag data 603.

In the fourth embodiment, the correction gamma value Gv is added into the image file as simple tag data and therefore does not influence the original image data or other information. Hence, the image file added with the gamma value tag can be returned to the original file anytime as needed.

As described above, the gamma value tag addition section 28 analyzes image data and obtains an appropriate gamma correction value for one image file, and adds or updates the gamma correction value as new tag data. Processing in steps S103 to S110 of FIG. 12 is repeated for all image files to be processed on the path to be searched.

It is more preferable that the series of processing shown in the flowchart of FIG. 12 be loaded as a back process job or a demon program executed in, e.g., an operating system capable of executing a multi-process.

As described above, when a gamma value tag is added to an image file, the time required for correction processing in printing the image file can be shortened. Correction of an image file added with a gamma value tag will be described below.

The image data storage formats in the memory section 21 will be described with reference to FIG. 16.

Figure 16:
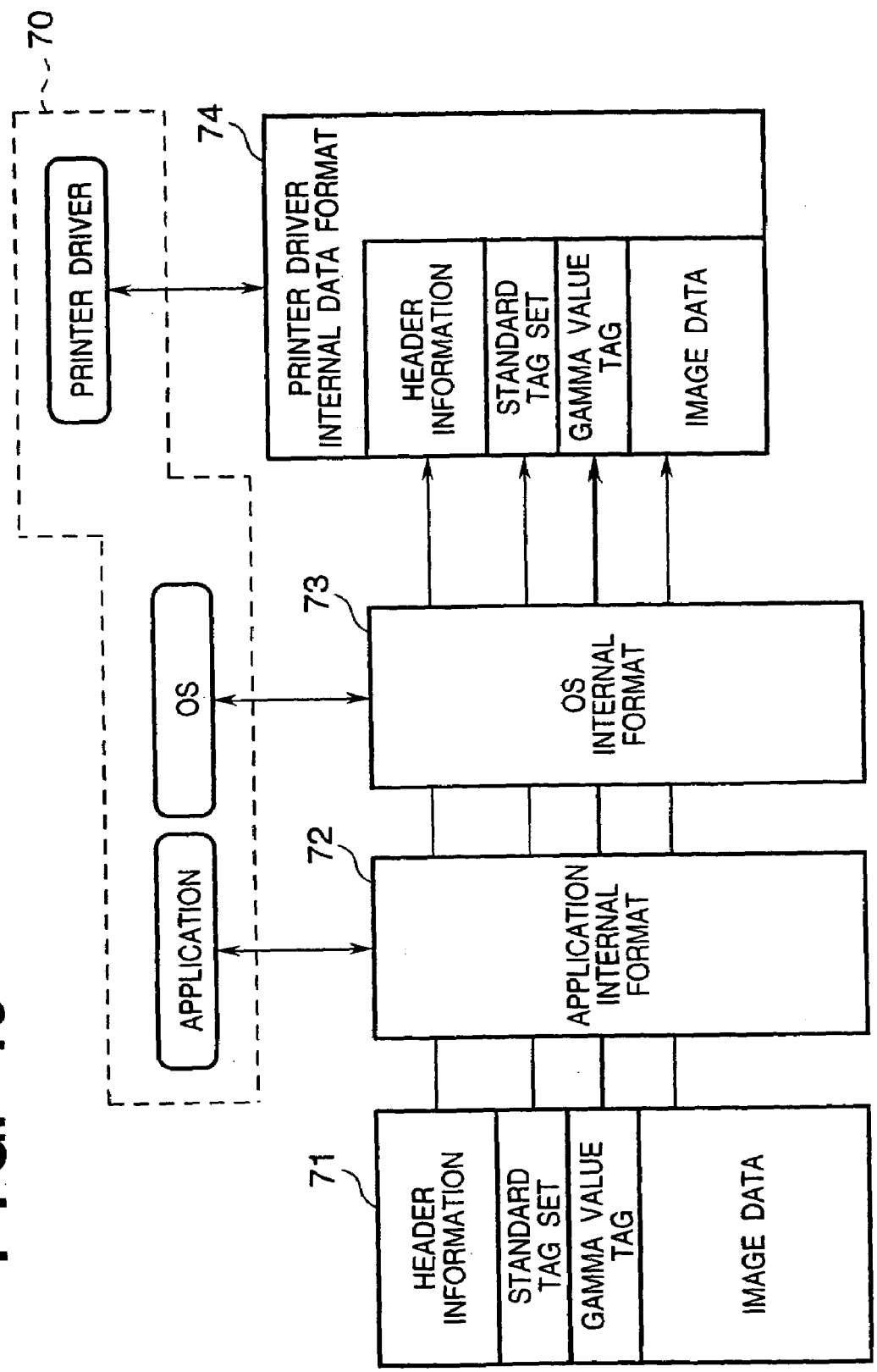
FIG. 16 is a view showing the image data file storage formats in the fourth embodiment.

Referring to FIG. 16, image data added with a gamma value tag is stored in the memory section 21 as a file 71. The file 71 has the above-described structure shown in FIG. 15B. More specifically, "magic number",. "version information", and "directory offset" in FIG. 15B correspond to the header information of the file 71 shown in FIG. 16, "tag 1" to "tag N" correspond to the standard tag set, and "tag (N+1)" corresponds to the gamma value tag.

Referring to FIG. 16, reference numeral 70 denotes a general idea of various programs executed by the CPU 30. The image data file 71 having the gamma value tag is converted into a file 72 with an application internal format by an application executed by the CPU 30. To print the image file by a printer, the file is further converted into an OS internal format 73 and then into a printer driver internal format 74.

In the fourth embodiment, the gamma value tag held by the input image file 71 must be transferred to the printer driver. To transfer the gamma value tag ("tag (N+1)" in FIG. 15B). To the printer driver, for example, the application adds an extension information area to the normal data structure.

Referring back to FIG. 11, processing by the printer driver will be mainly described below. As described above, the printer driver executes gamma conversion on the basis of the gamma value tag added to the image file.

First, a gamma table generation section 22 generates a gamma correction table 23 on the basis of the gamma value tag. An optimum one of a plurality of gamma tables prepared in advance may be selected and set as the gamma correction table 23.

Subsequently, as in the first embodiment, RGB data in the image file are subjected to gamma conversion, color space compression, color conversion, and binarization, and then output to an image output section 15 as a printer engine section.

As described above, according to the fourth embodiment, an appropriate correction parameter is determined in advance for image data stored in the file system and recorded in the extension tag of the file. Hence, the image can be appropriately corrected at high speed with reference to the tag information in printing.

According to the fourth embodiment, since gamma curve generation is performed during the execution time period designated in the window shown in FIG. 14E, reduced image data is not used, but the original image data can be analyzed to obtain a gamma value. By virtue of using original image data instead of reduced image data, highly precise analysis can be performed. As has been explained in the first embodiment, reduced image data is generated based on original image data, and has a smaller data amount than that of the original image data.

As a modification of the fourth embodiment, a mode utilizing a gamma curve generation method which employs the reduced image data explained in the first embodiment, may be added. In this mode, although precision may be deteriorated compared to the mode using the original image data, high speed processing is realized. By enabling to select a mode from these two modes according to user's designation, the apparatus can support various user requirements.

<Fifth Embodiment>

The fifth embodiment of the present invention will be described below.

In the above-described fourth embodiment, image data in a file is analyzed to set an appropriate gamma correction value as a gamma value tag. In the fifth embodiment, the user can arbitrarily set gamma correction parameters.

Figure 17A:
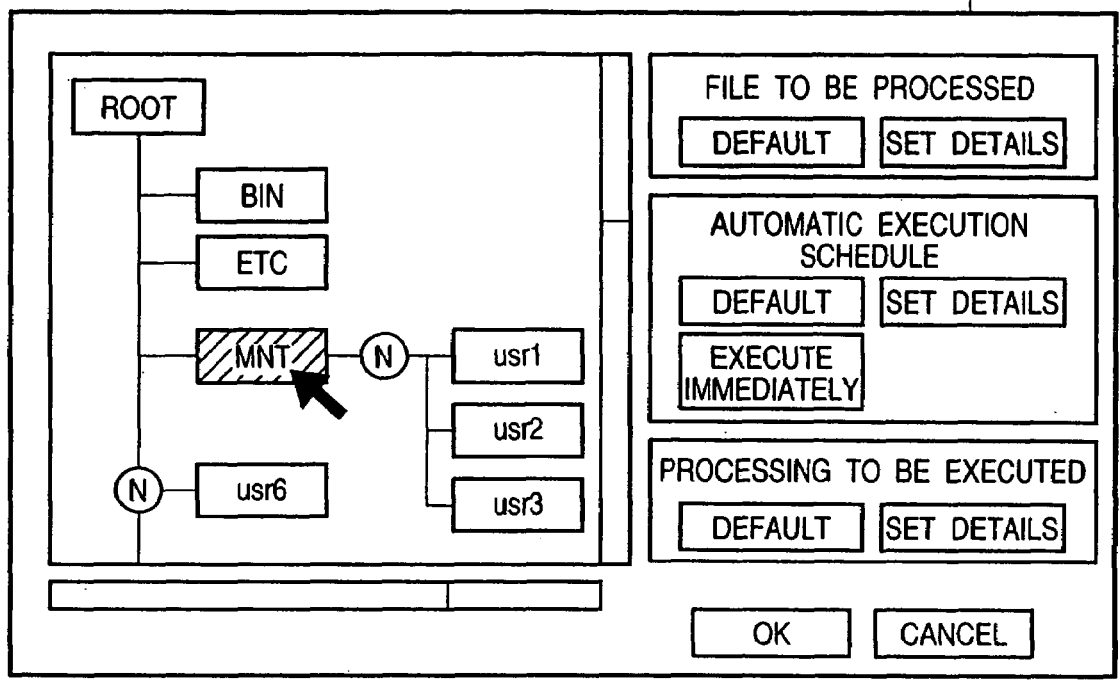
FIGS. 17A and 17B are views showing examples of setup windows for setting details of image correction parameters in the fifth embodiment of the present invention.

FIG. 17A is a view showing an example of a display window in an operation section 12 when setting detailed conditions for image correction (in this case, gamma correction) processing. In FIG. 17A, a description of setting items common to FIG. 13 described in the above fourth embodiment will be omitted. According to a window W27 shown in FIG. 17A, in addition to searching and setting a file to be processed and setting the automatic execution schedule by the user, details for gamma correction for image data of a file to be processed can be set.

Figure 17B:
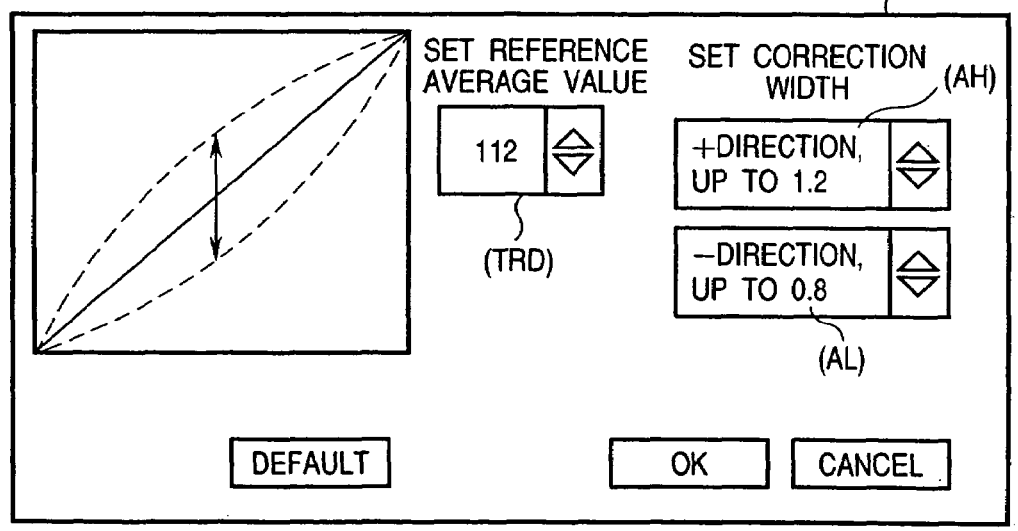

When the "set details" button in "processing to be executed" is depressed, a window W28 shown in FIG. 17B is displayed. In the window W28, the user can confirm and change current settings of various parameters (to be referred to as gamma correction parameters hereinafter) used for gamma correction, including a reference average density value (TRD), positive direction of correction width (AH), negative direction of correction width (AL), and correction intensity (WGT). Normally, for example, TRD=98, AH=1.2, and AL=0.8 are set as default values.

In the fifth embodiment, by setting the gamma correction parameters, a gamma correction value is calculated by the following method.

As for equation (5) of the second embodiment, let Lv (Lv≠0) be the average lightness of the printing image and VMAX (VMAX≠0) be the maximum density value. An upper limit AH and lower limit AL of the correction gamma value are defined by the functions CfM( ) and CfS( ), respectively. A correction gamma value Gv in the fifth embodiment is given by $$Gv = CfS(CfM(\ln(TRD/VMAX)/\ln(Lv))) \quad (7)$$

(where ln( ) is a natural logarithmic function)

When the calculated correction gamma value Gv is added to the image file as extension tag information, flexible gamma correction can be performed.

As described above, according to the fifth embodiment, the user can set gamma correction parameters, and high-speed printing with an arbitrary image quality can be performed.

<Sixth Embodiment>

The sixth embodiment of the present invention will be described below.

In the above-described fourth and fifth embodiments, the gamma correction value is added to the file as tag information in advance to omit cumbersome processing such as image analysis in printing, thereby realizing efficient processing. In some cases, however, printing without using the gamma correction value set in advance is required. In the sixth embodiment, the gamma correction tag added to the image file can be invalidated.

FIGS. 18A to 18C are views showing examples of display windows in an operation section 12 for color adjustment in printing in the sixth embodiment. For an image file having a gamma correction tag, when "Auto Color Manager" is selected in a window W31 shown in FIG. 18A, the image data is always corrected by bitmapping the data in a gamma table on the basis of the gamma correction value and then printed.

If the gamma correction tag already added to the image file is not to be used, the user selects "manual setup" in the window W31. When the "default" button in the window W31 is clicked, a set value that is set in advance is set independently of the gamma correction value. When the "set details" button is clicked, a window W32 shown in FIG. 18B is displayed. When the user needs no gamma correction in printing, the user selects "non-use of gamma correction tag" in the window W32. When "use gamma correction tag" is selected in the window W32, gamma correction based on the gamma correction tag added to the image file is executed, as in selection of "Auto Color Manager" in the window W31.

When gamma correction parameters are to be newly set in printing, "use setting in printing" is selected in the window W32, and the "set" button is clicked to display a window W33 shown in FIG. 18C. In the window W33, the user can arbitrarily set various parameters including a reference average density value (TRD), positive direction of correction width (AH), negative direction of correction width (AL), and correction intensity (WGT). By setting these various parameters, a gamma correction value can be calculated in consideration of setting of the correction intensity WGT following the same procedures as in the above-described third embodiment.

The gamma correction value obtained when "use setting in printing" is selected in the window W32, as described above, is valid with priority over tag information added to the original image file. Hence, even when the gamma correction value has already been set at, e.g., "1.2" for image data, this setting is neglected, and a new gamma correction value calculated on the basis of current setting is used.

In the sixth embodiment, use or non-use of the gamma correction tag is determined in color adjustment. This determination can be made at any timing as long as convenience for use is taken into consideration. For example, information set in advance may be invalidated at the time of printing, and the user may set information again at that time.

As described above, according to the sixth embodiment, the user can set the correction parameters, and high-speed printing with an arbitrary image quality is possible.

In addition to the image analysis method based on the average density value of all pixels, which is described in the first to sixth embodiments, more advanced and complex gamma correction and color correction methods are present. For example, an original image is segmented into areas, and the average density value is calculated in units of areas. Alternatively, an area such as a shadow portion, highlight portion, or intermediate density portion is detected, and the entire image is corrected to an optimum tone that is neither too dark nor too bright.

The same effect as that of the present invention can be substantially obtained by employing any analysis method as far as the image data is appropriately analyzed, parameters for image correction are calculated, the parameters are recorded in tag data or the like without damaging the originality of the image data, and appropriate correction processing is automatically executed in printing on the basis of information such as the tag data.

The control program for image analysis may be realized by a demon program in a server, occasionally forked (executed) from an application program, or executed simultaneously with the start of the printer menu or the start of printing.

The image data is bitmapped in the memory 21 in the image processing section 11. However, the present invention is not limited to this. The RAM in the apparatus or an external storage device may be used as far as it can be used as an image memory.

Setting of gamma correction parameters has been particularly described. However, the present invention can also be applied to other image processing parameters As has been described above, according to the present invention, appropriate correction processing can be performed at a high speed by determining correction parameters at a high speed on the basis of reduced image information of an image to be corrected.

In addition, since the user can arbitrarily set various parameters associated with image correction, a more preferable print environment can be provided.

Furthermore, since correction parameters are determined for image data held in the apparatus and added to the image data file in advance, high-speed image output processing can be performed at the time of output.

[Other Embodiments]

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium. In this case, the program codes read out from the storage medium realize the functions of the above-described embodiments by themselves, and the storage medium storing the program codes constitutes the present invention. As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes readout from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, it stores program codes corresponding to the above-described flow charts (FIGS. 5, 8, 10, and 12).

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   mode setting means for setting an automatic mode or a manual mode according to user instruction;
   input means for inputting an image file including original image data;
   analysis means for analyzing the image file and determining a correction parameter;
   setting means for setting the correction parameter for the original image data included in the image file; and
   correction means for correcting the original image data on the basis of the correction parameter,
   wherein
   when said mode setting means sets the automatic mode,
      if the image file includes tag data, said analysis means determines the correcting parameter on the basis of the tag data; and
      if the image file does not include the tag data and includes reduced image data, said analysis means determines the correcting parameter on the basis of the reduced image data; and
   when said mode setting means sets the manual mode, said analysis means determines the correcting parameter on the basis of user instruction.

2. The apparatus according to claim 1, wherein said apparatus further comprises printing means for printing.

3. The apparatus according to claim 2, wherein said setting means generates a table on the basis of the correction parameter.

4. The apparatus according to claim 3, wherein the table is a color look-up table.

5. The apparatus according to claim 2, wherein the correction parameter is a gamma correction parameter.

6. The apparatus according to claim 1, wherein when said mode setting means sets the automatic mode, if the image file includes neither the tag data nor the reduced image data, said analysis means determines the correcting parameter on the basis of the original image data.

7. The apparatus according to claim 1 wherein when said mode setting means sets the manual mode, said analysis means determines the correcting parameter on the basis of a correction value which is instructed by a user.

8. An image processing method applied to an apparatus comprising:
   a mode setting step of setting an automatic mode or an manual mode according to user instruction;
   an input step of inputting an image file including an original image data;
   an analysis step of analyzing the image file and determining a correction parameter;
   a setting step of setting the correction parameter for the original image data included in the image file; and
   a correction step of correcting the original image data on the basis of the correction parameter;
   wherein
   when said mode setting step sets the automatic mode,
      if the image file includes a tag data, said analysis step determines the correcting parameter on the basis of the tag data; and
      if the image file does not include the tag data and includes a reduced image data, said analysis step determines the correcting parameter on the basis of the reduced image data; and
   when said mode setting step sets the manual mode, said analysis step determines the correcting parameter on the basis of user instruction.

9. A computer-readable storage medium storing a computer program for executing the image processing method set forth in claim 8.

* * * * *

UNITED STATES PATENT AND TRADEMARK OFFICE
CERTIFICATE OF CORRECTION

PATENT NO. : 7,194,130 B2 Page 1 of 1
APPLICATION NO. : 10/967242
DATED : March 20, 2007
INVENTOR(S) : Nishikawa It is certified that error appears in the above-identified patent and that said Letters Patent is hereby corrected as shown below:

TITLE PAGE:
Item (75) Inventor, "Kanagawa-ken" should read -- Kawnsaki --.

COLUMN 9:
Line 36, "function) A" should read -- function) ¶ A --.

COLUMN 11:
Line 18, "instep S106." should read -- in step S106. --.

COLUMN 12:
Line 15, ""tag (N+1)" should read -- ("tag (N+1)" --; and
Line 16, "15B). To" should read -- 15B) to --.

COLUMN 15:
Line 35, "readout" should read -- read out --.

COLUMN 16:
Line 28, "claim 1" should read -- claim 1, --; and
Line 34, "or an" should read -- or a --.

Signed and Sealed this

Fifth Day of February, 2008

JON W. DUDAS
*Director of the United States Patent and Trademark Office*

UNITED STATES PATENT AND TRADEMARK OFFICE
CERTIFICATE OF CORRECTION

PATENT NO. : 7,194,130 B2  Page 1 of 1
APPLICATION NO. : 10/967242
DATED : March 20, 2007
INVENTOR(S) : Nishikawa It is certified that error appears in the above-identified patent and that said Letters Patent is hereby corrected as shown below:

TITLE PAGE,
ITEM (75) Inventor, "Kanagawa-ken" should read -- Kawasaki --.

COLUMN 9:
Line 36, "function) A" should read -- function) ¶ A --.

COLUMN 11:
Line 18, "instep S106." should read -- in step S106. --.

COLUMN 12:
Line 15, "("tag (N+1)" should read -- ("tag (N+1)" --; and
Line 16, "15B). To" should read -- 15B) to --.

COLUMN 15:
Line 35, "readout" should read -- read out --.

COLUMN 16:
Line 28, "claim 1" should read -- claim 1, --; and
Line 34, "or an" should read -- or a --.

Signed and Sealed this

Twelfth Day of February, 2008

JON W. DUDAS
*Director of the United States Patent and Trademark Office*